United States Patent
Cao et al.

(10) Patent No.: US 10,490,786 B2
(45) Date of Patent: Nov. 26, 2019

(54) BATTERY MODULE

(71) Applicant: Contemporary Amperex Technology Co., Limited, Ningde, Fujian (CN)

(72) Inventors: Gen Cao, Ningde (CN); Jihua Yao, Ningde (CN); Haidong Zhang, Ningde (CN); Jianli Chen, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 274 days.

(21) Appl. No.: 15/657,771

(22) Filed: Jul. 24, 2017

(65) Prior Publication Data

US 2018/0090729 A1    Mar. 29, 2018

(30) Foreign Application Priority Data

Sep. 23, 2016    (CN) .......................... 2016 1 0845652

(51) Int. Cl.
*H01M 2/10*    (2006.01)

(52) U.S. Cl.
CPC .................. *H01M 2/1016* (2013.01)

(58) Field of Classification Search
None
See application file for complete search history.

(56) References Cited

U.S. PATENT DOCUMENTS

| | | | |
|---|---|---|---|
| 2012/0315508 A1 | 12/2012 | Kurita | |
| 2015/0004469 A1* | 1/2015 | Park | H01M 2/1077 429/151 |
| 2017/0141367 A1* | 5/2017 | Kim | H01M 2/1061 |

FOREIGN PATENT DOCUMENTS

| | | |
|---|---|---|
| EP | 2819210 A1 | 12/2014 |
| EP | 3168898 A1 | 5/2017 |

OTHER PUBLICATIONS

The Partial European search report dated Nov. 16, 2017 for European application No. 17177915.0, 18 pages.
Anonymous., "Bushings for Locating Pins-Flanged, Standard, Configurable" Retrieved from the Internet: URL:https://us.misumi-ec.com/vona2/detail/110302666510/ the whole document, retrieved on Nov. 8, 2017.

* cited by examiner

*Primary Examiner* — Christopher P Domone
(74) *Attorney, Agent, or Firm* — Law Offices of Liaoteng Wang

(57) ABSTRACT

The present application relates to a battery module. A battery module includes a base, end plates, side plates and a plurality of sleeve members, wherein the end plates and the side plates are connected to the base through the sleeve members, and each sleeve member includes a pipe body and a connecting piece. The battery module further includes a transition piece having a transition plane perpendicular to the axis of the pipe body. The connecting piece has a mating surface toward the transition piece, and the mating surface clings to the transition plane. This solution enables the connecting piece to be screwed into the base along the axis of the pipe body, reducing the difficulty of connecting the connecting piece to the base, and improving the installation efficiency.

16 Claims, 4 Drawing Sheets

BATTERY MODULE

CROSS-REFERENCE TO RELATED APPLICATION

This application is based on and claims priority to Chinese Patent Application No. 201610845652.4 filed on Sep. 23, 2016, which is incorporated herein by reference in its entirety.

TECHNICAL FIELD

The present application relates to the field of battery technology, and particularly to a battery module.

BACKGROUND

A battery module generally includes a plurality of cells, a pair of end plates, a pair of side plates, a base and a plurality of sleeve members. The pair of end plates and the pair of side plates are connected to each other to form a frame of the battery module, and the plurality of cells are disposed side by side within the metal frame. The sleeve member includes a sleeve and a fastening bolt. The sleeve is disposed at a corner of the metal frame and is fixedly connected to the end plate or the side plate. The fastening bolt extends through the sleeve toward the base, with the head thereof the fastening bolt abutting against the upper end face of the sleeve, and the threaded portion of the tail thereof being screwed into the base and the metal frame is fixed to the base.

The upper end face of the sleeve generally has poor flatness because of effect of an involved processing process. For example, when the sleeve is processed in a rolled manner, a convex hull is formed on the upper end face of the sleeve due to pressing stress at the time of rolling, as known from principles of mechanics. When the fastening bolt is attached to the upper end face of the sleeve, the threaded portion of the fastening bolt can't be screwed into the base along the direction of its own axis, which increases the difficulty of connecting the fastening bolt to the base, and reduces the installation efficiency. Therefore, it is necessary to propose an improved solution to solve the drawbacks described above.

SUMMARY

According to embodiments of the present application, there is provided a battery module which can improve the drawbacks described above.

A battery module comprises a base, end plates, side plates and a plurality of sleeve members, wherein the end plates and the side plates are connected to the base through the sleeve members, and each sleeve member comprises a pipe body and a connecting piece. The battery module further comprises a transition piece having a transition plane perpendicular to the axis of the pipe body, wherein the connecting piece has a mating surface toward the transition piece, and the mating surface clings to the transition plane.

It is to be understood that both the foregoing general descriptions and the following detailed descriptions are only exemplary, and are not intended to limit the present application.

REFERENCE LABELS IN THE DRAWINGS

1—battery cell;
2—end plate;
21—first end plate;
211—first fold;
212—recess;
22—second end plate;
221—first groove;
3—side plate;
4—pipe body;
5—transition piece;
51—transition plane;
52—sleeve;
521—guide surface
53—extension plate.

The drawings herein, which are incorporated in and constitute a part of the specification, illustrate embodiments consistent with the present application, and serve to explain the principles of the present application together with the description.

DETAILED DESCRIPTION

The present application is further described in detail below by way of specific embodiments and in conjunction with the accompanying drawings.

Figure 1:
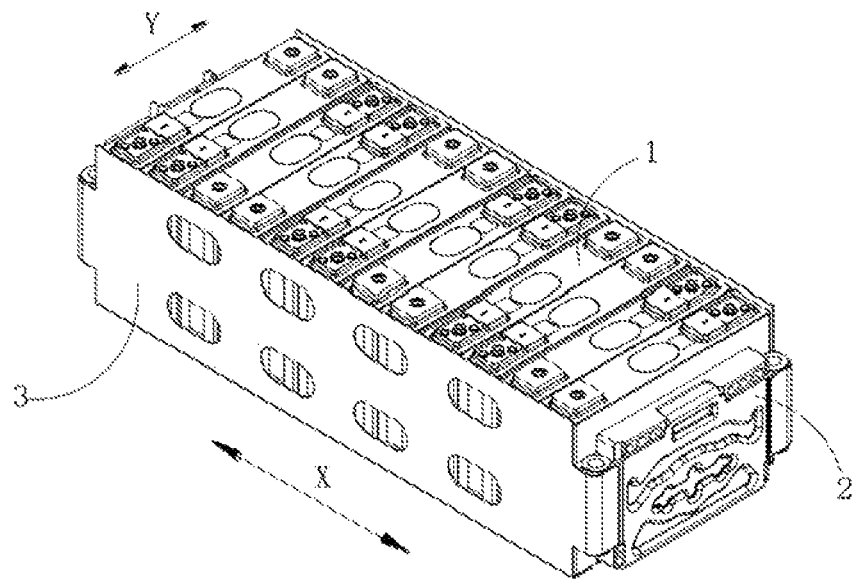
FIG. 1 is an assembly diagram of a battery module according to embodiments of the present application.
Figure 2:
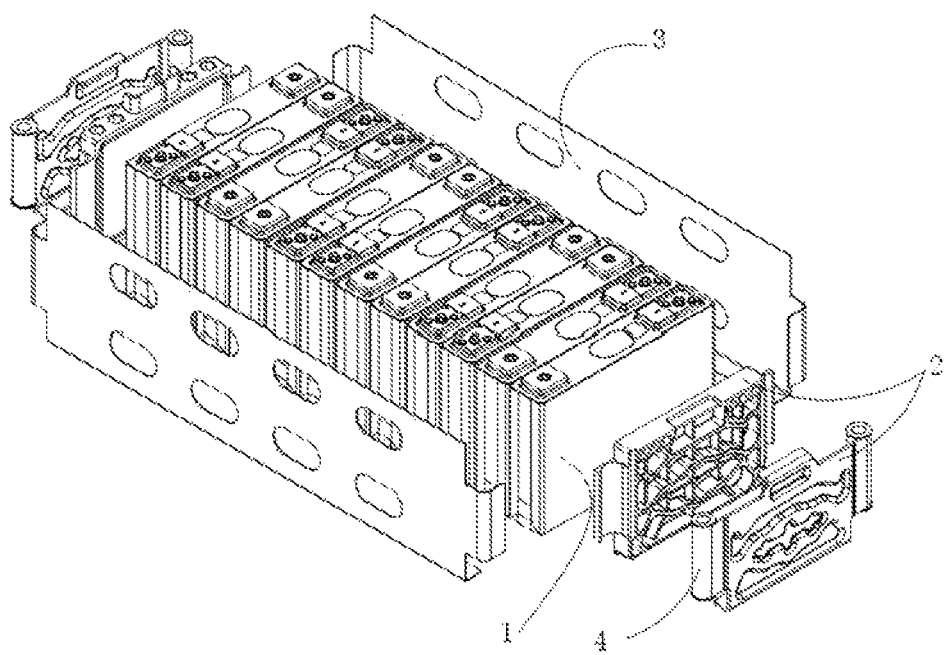
FIG. 2 is a exploded view of a battery module according to embodiments of the present application.

As shown in FIGS. 1 and 2, according to embodiments of the present application, there is provided a battery module including a base (not shown in the figures), a plurality of battery cells 1, a pair of end plates 2, a pair of side plates 3, and a plurality of sleeve members.

The plurality of battery cells 1, according to series-parallel connection requirements of the battery module, are located on the base and are stacked along thickness direction of the battery cells 1, and their surfaces in the width direction of the battery cells 1 cling closely to each other. The pair of end plates 2 are located on both sides of the plurality of battery cells 1 in the thickness direction (X direction in FIG. 1) respectively, and are close to the battery cells 1 at the outermost position of the plurality of battery cells 1, and extend along the width direction of the battery cells 1 (Y direction in FIG. 1). The pair of side plates 3 are located on both sides of the plurality of battery cells 1 in the width direction respectively, and extend along the thickness direction of the battery cells 1.

The end plates 2 are fixedly connected to the side plates 3, and are connected to the base through the sleeve members. The sleeve member includes a pipe body 4 and a connecting piece (not shown). The pipe body 4 extends along the height direction of the battery cells 1 and is connected to the side plate 3 or the end plate 2. The connecting piece may be a bolt, and the threaded portion on the connecting piece is pierced from the pipe body 4 and extends toward the base to screw the side plate 3 and the end plate 2 onto the base.

Typically, the pipe body 4 may be produced via a casting process, and the pipe body 4 may be used as a separate element. In addition, the pipe body 4 may be integrally formed on both ends of the end plate 2 or the side plate 3 in a rolled manner. That is, the pipe body 4 together with the end plate 2 or the side plate 3 may form an integrative structure. In an embodiment, as shown in FIG. 2, the pipe body 4 and the end plate 2 are in an integrative structure, which can save the connection structure between the pipe body 4 and the end plate 2, and has a higher connection strength than a separable structure.

Figure 3:
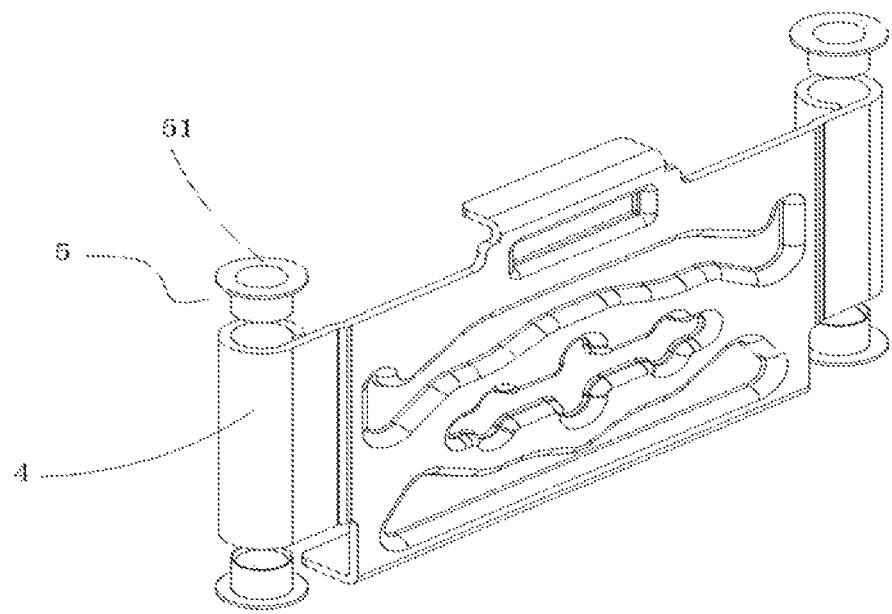
FIG. 3 is a schematic diagram showing connection of a transition piece and a pipe body according to embodiment of the present application.

As shown in FIG. 3, the battery module further includes a transition piece 5 having a transition plane 51 thereon. After the transition piece 5 is mounted, the transition plane 51 is vertical to the axis of the pipe body 4. Here, "vertical" means that the transition plane 51 is substantially perpendicular to the axis of the pipe body 4. That is, the vertical angle allows a small angle deviation, and may not strictly be a right angle. When the connecting piece passes through the pipe body 4, the mating surface on the connecting piece toward the transition piece 5 clings to the transition plane 51 so that the connecting piece can be screwed into the base along the axis of the pipe body 4, reducing the difficulty for connecting the connecting piece with the base, and improving the installation efficiency for the battery module.

In an embodiment, the transition piece 5 may include a positioning section and a supporting section. The positioning section is connected to the supporting section. The positioning section can be used to locationally fit with the pipe body 4, and the supporting section can be used to provide the transition plane 51. For example, the positioning section may have a plurality of positioning pawls disposed along the circumferential surface of the pipe body 4 to clamps the pipe body 4 so as to achieve positioning. The supporting section may be a flat plate, and in such case the transition plane is the surface of the flat plate.

Figure 4:
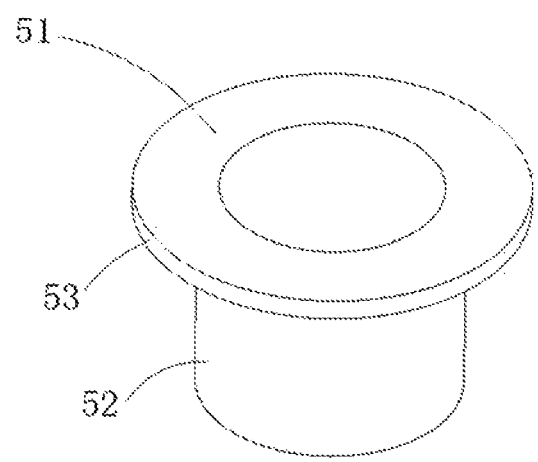
FIG. 4 is a perspective view of a transition piece according to embodiments of the present application.

In an embodiment, as shown in FIG. 4, the transition piece 5 includes a sleeve 52 and an extension plate 53. The extension plate 53 extends outwardly from the outer peripheral surface of the sleeve 52 along the radial direction of the sleeve 52, and has a surface facing the mating surface as the transition plane 51. In this embodiment, the positioning section employs the sleeve 52, and the supporting section employs the extension plate 53. The sleeve 52 is fitted with the pipe body 4 and the extension plate 53 is supported on the upper end face of the pipe body 4. The extension plate 53 would not tilt due to locational fitting of the pipe body 4 with the sleeve 52, which ensures that the transition plane 51 can well cling to the mating surface. The transition piece 5 in this embodiment has a simple structure and is easy to be manufactured.

In addition, the transition piece 5 can also locationally fit with the end plate 2 or the side plate 3 by the positioning section. The positioning section and the supporting section can be varied or modified depending on structure of the end plate 2 or the side plate 3.

In an embodiment, as shown in FIG. 3, the sleeve 52 is disposed inside the pipe body 4, which saves the space occupied by the sleeve 52 within the battery module. In practice, the sleeve 52 may be disposed to wrap outside of the pipe body 4, and accordingly, a stripe seam may be provided on the sleeve 52 along its axial direction to prevent interference with the end plate 2 during installation of the sleeve 52 and the pipe body 4.

Figure 5:
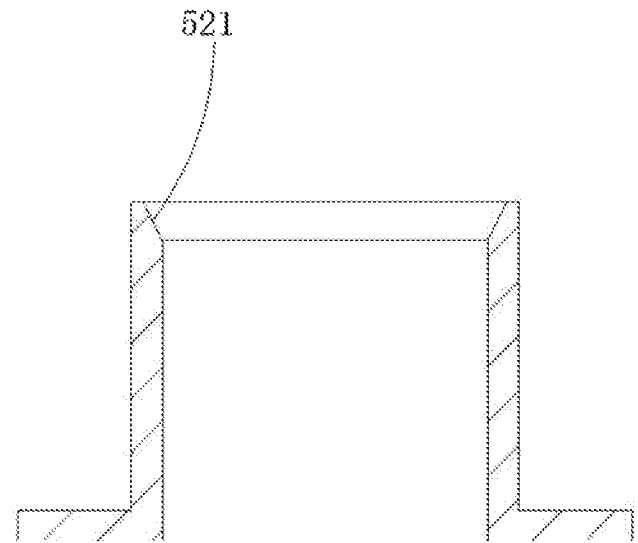
FIG. 5 is a cross-sectional view of a transition piece according to embodiments of the present application.

In addition, in order to ensure that the connecting piece passes smoothly through the transition piece 5, the present application is also preferably provided with a guide surface 521 on inner wall at one end of the sleeve 52 away from the supporting section. As shown in FIG. 5, the guide surface 521 tilts from the inner wall toward the outer wall of the sleeve 52. The provision of the guide surface 521 allows the connecting piece to smoothly pass through the sleeve 52, avoiding obstruction to insertion or removal of the connecting piece due to burrs on the end face of the sleeve 52.

The sleeve 52 may be of a sleeve of any shape such as a square sleeve or a circular sleeve, etc., as long as the sleeve 52 can be fitted with the pipe body 4. In the embodiment as shown in FIG. 4, the sleeve 52 is a circular sleeve whose cross-section is a circular ring in shape, and accordingly, the cross-section of the pipe body 4 is also a circular ring in shape. In such embodiment, the processing of the sleeve 52 is relatively simple. However, when the connecting piece is screwed into the base, the circular sleeve 52 would rotate relative to the pipe body 4 with a rotational torque, resulting in a relative displacement between the circular sleeve 52 and the pipe body 4 along the circumferential direction of the pipe body 4. In order to avoid occurrence of this phenomenon, a stopper may be provided to limit the circumferential displacement of the sleeve 52 with respect to the pipe body 4. For example, the stopper may be a boss provided on the outer wall of the sleeve 52, and the abutment of the boss and the inner wall of the pipe body 4 may be used to limit the displacement and to reduce the amount of rotation of the sleeve 52 with respect to the pipe body 4. The solution is simple and the processing difficulty is low. In another embodiment, the stopper may also include a lock plate provided on the supporting section and a lock slot provided on the pipe body 4. When the transition piece 5 is mounted to the pipe body 4, the lock plate can be locked into the lock slot, thereby the amount of rotation of the sleeve 52 with respect to the pipe body 4 can be reduced.

In addition to the manner in which the stopper is employed, the transition piece 5 can be welded to the pipe body 4 so as to be relatively fixed therebetween so that there is no relative displacement between the pipe body 4 and the transition piece 5 in any direction. The transition piece 5 and the pipe body 4 may be connected by laser welding, and the welding method may be preferably butt welding, and there may be 2 to 3 butt welding portions. In addition, other welding methods such as argon arc welding, soldering welding, penetration welding can also be used. However, compared with butt welding, these welding method such as argon arc welding, soldering welding, penetration welding are likely to cause accumulation of solders, which will affect appearance and subsequent assembly. Thus, the butt welding results better results.

Figure 6:
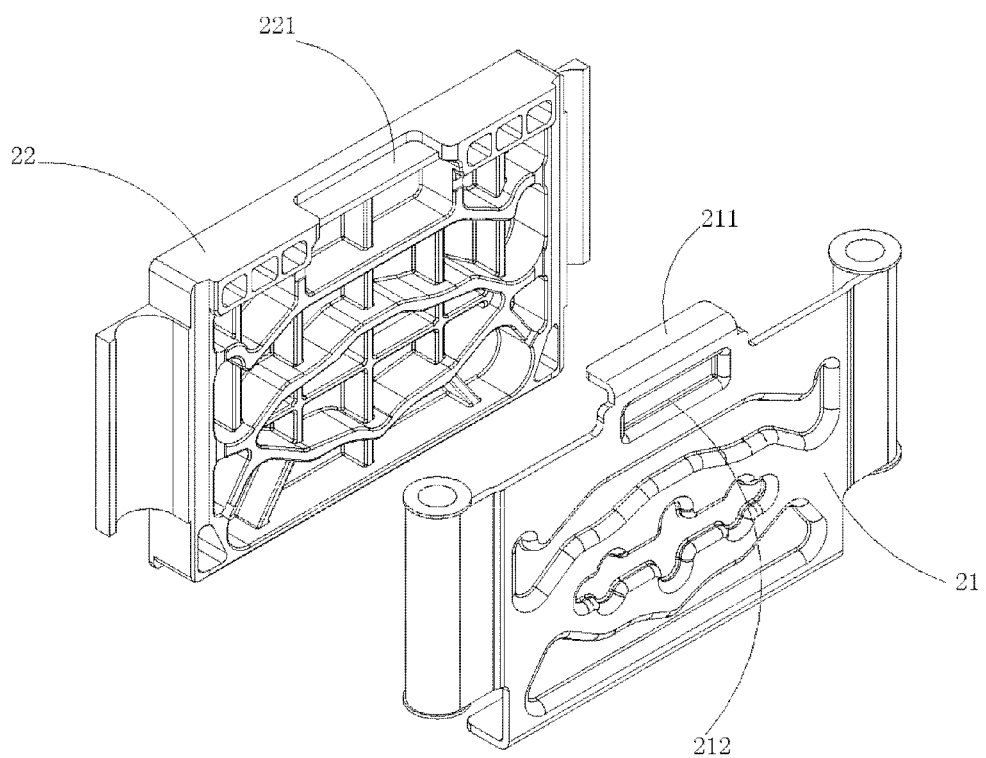
FIG. 6 is an assembly diagram of an end plate according to embodiments of the present application.

In the present application, as shown in FIG. 6, the end plates 2 may also preferably include a first end plate 21 and a second end plate 22. The pipe body 4 is formed on the first end plate 21. The first end plate 21 is located away from the battery cells 1. The second end plate 22 is in close proximity to the battery cells 1. The first end plate 21 is connected to the second end plate 22 to form a double-layer structure in which there is a cavity. The end plate 2 is capable of withstanding a greater bending deformation than an end plate of a single-layer structure. When the battery cells 1 are inflated, the resulting expansion force would act on the end plate 2. If the deformation of the end plate 2 under the action of the expansion force is large, the damage to the battery module would be caused. The end plate 2 in the solution has enhanced rigidity and has strengthened ability to resist deformation, and thus the risk of damage to the battery module can be reduced.

In order to achieve weight reduction of the battery module, it may also be preferable that the second end plate 22 is provided as a plastic material and is processed by an integrative injection molding process, which simplifies the processing process of the second end plate 22 and also reduces the weight of the second end plate 22. Further, the second end plate 22 may be provided with a plurality of reinforcing ribs extending along different directions of the second end plate 22 and intersecting with each other. When the first end plate 21 is connected to the second end plate 22, a cavity is formed at a position where no reinforcing rib is provided.

Likewise, in order to increase the strength of the first end plate 21, the first end plate 21 may be provided with a press-formed recess for enabling reinforcement effects so that the rigidity of the first end plate 21 is increased.

Structures by which the strength of the first end plate 21 and the second end plate 22 can be enhanced are not limited to those described above, and there are various possible implementations for the reinforcing structure, which will not be described in detail.

For ease of assembly, the end plates 2, if it is a separable structure, are provided with a first stopper and a second stopper. The first stopper is used to limit the relative displacement between the first end plate 21 and the second end plate 22 along the height direction of the battery cells 1, and the second stopper is used to limit the relative displacement between the first end plate 21 and the second end plate 22 toward the side plate 3. In this way, in assembling the battery module, the first end plate 21 and the second end plate 22 can be first locationally fitted so as to enable the subsequent assembling process to be relatively simple.

In particular, as shown in FIG. 6, the first end plate 21 extends at both ends in the height direction of the battery cells 1 toward the second end plate 22 respectively, to form a first fold 211 and a second fold respectively. The second end plate 22 is provided with grooves corresponding to the first fold 211 and the second fold respectively, i.e., the first groove 221 and the second groove. The first fold 211 is embedded in the first groove 221, and the second fold is embedded in the second groove. A surface of the first fold 211 facing the second fold clings to the bottom surface of the first groove 221, and a surface of the second fold facing the first fold 211 cling to the bottom surface of the second groove. The first fold 211 and the first groove 221, as well as the second fold and the second groove forms a first stopper structure, which limits the relative displacement between the first end plate 21 and the second end plate 22 along the height direction of the battery cells 1. The two side surfaces of the first fold 211 extending toward the second end plate 22 abut against two opposite side walls of the first groove 221, respectively, to form a second stopper structure, which limits the relative displacement between the first end plate 21 and the second end plate 22 toward the side plate 3.

Figure 7:
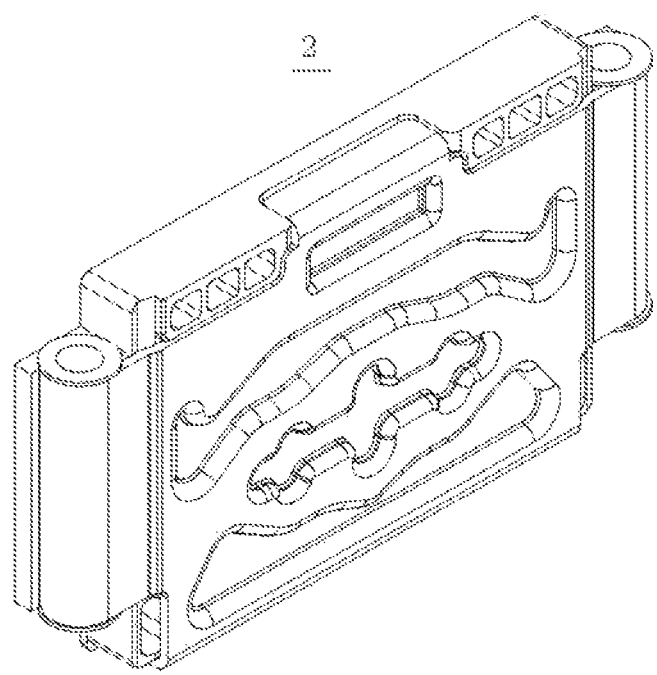
FIG. 7 is a exploded view of an end plate p according to embodiments of the present application.

After the first end plate 21 and the second end plate 22 are limited in displacement by mating the first fold 211 with the first groove 221 as well as mating the second fold with the second groove, the end plate 2 is formed as shown in FIG. 7.

It should be understood that the manner in which the relative displacement of the first end plate 21 and the second end plate 22 is limited is not limited to those described above. For example, the first fold 211 may be provided on the second end plate 22, and the first groove 221 may be provided on the first end plate 21. Also, the first stopper structure and the second stopper structure may be realized by positioning holes and positioning studs.

As shown in FIG. 7, the two first end plates 21 are respectively provided with recesses 212 for mating with the spreaders, which cooperate with the spreaders to enable lifting of the battery modules.

The foregoing descriptions are merely the preferred embodiments of the present application and are not intended to limit the present application, and various changes and modifications may be made by those skilled in the art. Any modifications, equivalent substitutions, improvements, and the like within the spirit and principles of the application are intended to be included within the claimed scope of the present application.

What is claimed is:

1. A battery module comprising a base, end plates, side plates and a plurality of sleeve members, wherein the end plates and the side plates are connected to the base through the sleeve members, and each sleeve member comprises a pipe body and a connecting piece, wherein the battery module further comprises a transition piece having a transition plane perpendicular to the axis of the pipe body, wherein the transition piece comprises a positioning section and a supporting section, wherein the positioning section comprises a sleeve fitted with the pipe body, and wherein the connecting piece has a mating surface toward the transition piece, and the mating surface clings to the transition plane, wherein the battery module further comprises:

a stopper for limiting circumferential displacement of the sleeve with respect to the pipe body, wherein the stopper comprises a boss on the outer peripheral surface of the sleeve, and the boss abuts against the inner wall of the pipe body.

2. The battery module of claim 1, wherein the positioning section is connected to the supporting section and locationally fits with the pipe body, and the transition plane is provided on the supporting section.

3. The battery module of claim 1, wherein the sleeve is disposed inside the pipe body.

4. The battery module of claim 1, wherein the supporting section comprises an extension plate extending outwardly from outer peripheral surface of the sleeve along radial direction of the sleeve, and wherein the transition plane is provided on a surface of the extension plate facing the mating surface.

5. The battery module of claim 1, wherein the sleeve has a guide surface on inner wall at one end of the sleeve away from the supporting section, wherein the guide surface tilts from the inner wall toward outer wall of the sleeve.

6. The battery module of claim 1, wherein each of the sleeve and the pipe body has a cross section of a circular ring.

7. The battery module of any of claim 1, wherein each of the end plates comprises a first end plate and a second end plate, and the first end plate is connected to the second end plate to form a double-layer structure in which there is a cavity.

8. The battery module of any of claim 2, wherein each of the end plates comprises a first end plate and a second end plate, and the first end plate is connected to the second end plate to form a double-layer structure in which there is a cavity.

9. The battery module of any of claim 1, wherein each of the end plates comprises a first end plate and a second end plate, and the first end plate is connected to the second end plate to form a double-layer structure in which there is a cavity.

10. The battery module of any of claim 3, wherein each of the end plates comprises a first end plate and a second end plate, and the first end plate is connected to the second end plate to form a double-layer structure in which there is a cavity.

11. The battery module of any of claim 4, wherein each of the end plates comprises a first end plate and a second end plate, and the first end plate is connected to the second end plate to form a double-layer structure in which there is a cavity.

12. The battery module of any of claim 5, wherein each of the end plates comprises a first end plate and a second end plate, and the first end plate is connected to the second end plate to form a double-layer structure in which there is a cavity.

13. The battery module of any of claim 6, wherein each of the end plates comprises a first end plate and a second end plate, and the first end plate is connected to the second end plate to form a double-layer structure in which there is a cavity.

14. The battery module of any of claim 1, wherein each of the end plates comprises a first end plate and a second end plate, and the first end plate is connected to the second end plate to form a double-layer structure in which there is a cavity.

15. The battery module of claim 7, wherein each of the end plates further comprises a first stopper structure for limiting relative displacement of the first end plate and the second end plate along the height direction of the battery cells.

16. The battery module of claim 7, wherein each of the end plates further comprises a second stopper structure for limiting relative displacement of the first end plate and the second end plate toward the side plates.

* * * * *